(12) United States Patent
Smalley et al.

(10) Patent No.: US 7,090,819 B2
(45) Date of Patent: *Aug. 15, 2006

(54) GAS-PHASE PROCESS FOR PURIFYING SINGLE-WALL CARBON NANOTUBES AND COMPOSITIONS THEREOF

(75) Inventors: Richard E. Smalley, Houston, TX (US); Robert H. Hauge, Houston, TX (US); Wan-Ting Chiang, Ponca City, OK (US); Yuemei Yang, Houston, TX (US); Kenneth A. Smith, Houston, TX (US); Wilber Carter Kittrell, Houston, TX (US); Zhenning Gu, Houston, TX (US)

(73) Assignee: William Marsh Rice University, Houston, TX (US)

( * ) Notice: Subject to any disclaimer, the term of this patent is extended or adjusted under 35 U.S.C. 154(b) by 387 days.

This patent is subject to a terminal disclaimer.

(21) Appl. No.: 10/071,166

(22) Filed: Feb. 8, 2002

(65) Prior Publication Data

US 2002/0159944 A1    Oct. 31, 2002

Related U.S. Application Data

(60) Provisional application No. 60/284,419, filed on Apr. 17, 2001, provisional application No. 60/268,228, filed on Feb. 12, 2001.

(51) Int. Cl.
*D01F 9/12*    (2006.01)
(52) U.S. Cl. .............................. 423/447.6; 423/447.7; 423/461
(58) Field of Classification Search ............. 423/447.6, 423/447.7, 460, 447.1, 461
See application file for complete search history.

(56) References Cited

U.S. PATENT DOCUMENTS 6,331,209 B1 * 12/2001 Jang et al. ..................... 117/90
6,752,977 B1 * 6/2004 Smalley et al. .......... 423/447.1

FOREIGN PATENT DOCUMENTS

EP    1 061 040 A1    12/2000
EP    1 061 042 A1    12/2000

OTHER PUBLICATIONS

Tohji, et al., "Purifying single-walled nanotubes," *Nature*, vol. 383, Oct. 24, 1996, p. 679.
Bougrine, et al., "Influence of high temperature treatments on single-walled carbon nanotubes structure, morphology and surface properties," *Carbon*, vol. 39 (2001), pp. 685-695.
Hou, et al., "Purification of single-walled carbon nanotubes synthesized by the hydrogen arc-discharge method," *J. Mater. Res.*, vol. 16, No. 9, Sep. 2001, pp. 2526-2529.
Grimes, et al., "Effect of purification of the electrical conductivity and complex permittivity of multiwall carbon nanotubes," *Journal of Applied Physics*, vol. 90, No. 8, Oct. 15, 2001, pp. 4134-4137.
Zimmerman, et al., "Gas-Phase Purification of Single-Wall Carbon Nanotubes," *Chem. Mater.* vol. 12 (2000), pp. 1361-1366.
Chiang, et al., "Purification and Characterization of Single-Wall Carbon Nanotubes (SWNTs) Obtained from the Gas-Phase Decomposition of CO (HiPco Process)," *J. Phys. Chem. B.*, vol. 105 (2001), pp. 8297-8301.
Chiang, et al., "Purification and Characterization of Single-Wall Carbon Nanotubes," *J. Phys. Chem. B.*, vol. 105 (2001), pp. 1157-1161.
Moon, et al., "High-Yield Purification Process of Singlewalled Carbon Nanotubes," *J. Phys. Chem. B.*, vol. 105 (2001), pp. 5677-5681.
Bandow, et al., "Purification and magnetic properties of carbon nanotubes," *Applied Physics A*, vol. 67 (1998), pp. 23-27.
Duesberg, et al., "Towards processing of carbon nanotubes for technical applications," *Applied Physics A.*, vol. 69 (1999), pp. 269-274.
Rinzler, et al., "Large-scale purification of single-wall carbon nanotubes: process, product, and characterization," *Applied Physics* A, vol. 67 (1998), pp. 29-37.
Zhou, et al, "Structural characterization and diameter-dependent oxidative stability of single wall carbon nanotubes synthesized by the catalytic decomposition of CO," *Chem. Phys. Lett.*, 350 (2001), pp. 6-14.

(Continued)

*Primary Examiner*—Stuart Hendrickson
(74) *Attorney, Agent, or Firm*—Ross Spencer Garsson; Edward T. Mickelson; Winstead Sechrest & Minick P.C.

(57) ABSTRACT

The present invention relates to an all gas-phase process for the purification of single-wall carbon nanotubes and the purified single-wall carbon nanotube material. Known methods of single-wall carbon nanotube production result in a single-wall carbon nanotube product that contains single-wall carbon nanotubes in addition to impurities including residual metal catalyst particles and amounts of small amorphous carbon sheets that surround the catalyst particles and appear on the sides of the single-wall carbon nanotubes and "ropes" of single-wall carbon nanotubes. The purification process removes the extraneous carbon as well as metal-containing residual catalyst particles. The process comprises oxidation of the single-wall carbon nanotube material, reduction and reaction of a halogen-containing gas with the metal-containing species. The oxidation step may be done dry or in the presence of water vapor. The present invention provides a scalable means for producing high-purity single-wall carbon nanotube material.

55 Claims, 3 Drawing Sheets

OTHER PUBLICATIONS

Jeong, et al., "A new purification method of single-wall carbon nanotubes using $H_2S$ and $O_2$ mixture gas," *Chem. Phys. Lett.*, 344 (2001), pp. 18-22.

Dujardin, et al., "Purification of Single-Shell Nanotubes," *Adv. Mater.*, vol. 10, No. 8 (1998), pp. 611-613.

Dillon, et al., "A Simple and Complete Purification of Single-Walled Carbon Nanotube Materials," *Adv. Mater.*, vol. 11, No. 16 (1999), pp. 1354-1358.

Tohji, et al., "Purification Procedure for Single-Walled Nanotubes," *J. Phys. Chem. B*, vol. 101 (1997), pp. 1974-1978.

Dai, et al; Single-Wall Nanotubes Produced by Metal-Catalyzed Disproportionation of Carbon Monoxide; Sep. 27, 1996; Chemical Physics Letters vol. 260 (1996); p. 473; Elsevier Science B.V.

* cited by examiner

GAS-PHASE PROCESS FOR PURIFYING SINGLE-WALL CARBON NANOTUBES AND COMPOSITIONS THEREOF

CROSS-REFERENCES TO RELATED APPLICATION

This application claims priority from U.S. provisional applications, Ser. Nos. 60/268,228, filed Feb. 12, 2001, and 60/284,419, filed Apr. 17, 2001, which applications are each incorporated herein by reference.

This patent application is related to U.S. patent application Ser. No. 10/068,907, "PROCESS FOR PURIFYING SINGLE-WALL CARBON NANOTUBES AND COMPOSITIONS THEREOF," to Smalley, et al., filed concurrent herewith (which application issued as U.S. Pat. No. 6,752,977 on Jun. 22, 2004). This United States Patent Application is also incorporated herein by reference.

This invention was made with United States Government support under Grant No. NCC9-77 and Grant No. DMR-0073046 awarded by the National Aeronautical and Space Administration and the National Science Foundation, respectively. Government may have certain rights in the invention.

BACKGROUND OF THE INVENTION

Fullerenes are spheroidal, closed-cage molecules consisting essentially of $sp^2$-hybridized carbons typically arranged in hexagons and pentagons. Fullerenes, such as $C_{60}$, also known as Buckminsterfullerene, more commonly, "buckyballs," and $C_{70}$, have been produced from vaporized carbon at high temperature. Presence of a transition metal catalyst with the high temperature vaporized carbon results in the formation of single-wall tubular structures which may be sealed at one or both ends with a semifullerene dome. These carbon cylindrical structures, known as single-wall carbon nanotubes or, commonly, "buckytubes" have extraordinary properties, including both electrical and thermal conductivity and high strength.

Nested single-wall carbon cylinders, known as multi-wall carbon nanotubes, possess properties similar to the single-wall carbon nanotubes; however, single-wall carbon nanotubes have fewer defects, rendering them stronger, more conductive, and typically more useful than multi-wall carbon nanotubes of similar diameter. Single-wall carbon nanotubes are believed to be much more free of defects than are multi-wall carbon nanotubes because multi-wall carbon nanotubes can survive occasional defects by forming bridges between the unsaturated carbon of the neighboring cylinders, whereas single-wall carbon nanotubes have no neighboring walls for defect compensation.

In defining the size and conformation of single-wall carbon nanotubes, the system of nomenclature described by Dresselhaus et al., Science of Fullerenes and Carbon Nanotubes, 1996, San Diego: Academic Press, Ch. 19, will be used. Single-wall tubular fullerenes are distinguished from each other by a double index (n, m), where n and m are integers that describe how to cut a single strip of hexagonal graphite such that its edges join seamlessly when the strip is wrapped onto the surface of a cylinder. When n=m, the resultant tube is said to be of the "arm-chair" or (n, n) type, since when the tube is cut perpendicularly to the tube axis, only the sides of the hexagons are exposed and their pattern around the periphery of the tube edge resembles the arm and seat of an arm chair repeated n times. When m=0, the resultant tube is said to be of the "zig zag" or (n, 0) type, since when the tube is cut perpendicular to the tube axis, the edge is a zig zag pattern. Where n≠m and m≠0, the resulting tube has chirality. The electronic properties are dependent on the conformation, for example, arm-chair tubes are metallic and have extremely high electrical conductivity. Other tube types are metallic, semi-metals or semi-conductors, depending on their conformation. Regardless of tube type, all single-wall nanotubes have extremely high thermal conductivity and tensile strength.

Several methods of synthesizing fullerenes have developed from the condensation of vaporized carbon at high temperature. Fullerenes, such as $C_{60}$ and $C_{70}$, may be prepared by carbon arc methods using vaporized carbon at high temperature. Carbon nanotubes have also been produced as one of the deposits on the cathode in carbon arc processes.

Single-wall carbon nanotubes have been made in a DC arc discharge apparatus by simultaneously evaporating carbon and a small percentage of Group VIIIb transition metal from the anode of the arc discharge apparatus. These techniques allow production of only a low yield of carbon nanotubes, and the population of carbon nanotubes exhibits significant variations in structure and size.

Another method of producing single-wall carbon nanotubes involves laser vaporization of a graphite substrate doped with transition metal atoms (such as nickel, cobalt, or a mixture thereof) to produce single-wall carbon nanotubes. The single-wall carbon nanotubes produced by this method tend to be formed in clusters, termed "ropes," of about 10 to about 1000 single-wall carbon nanotubes in parallel alignment, held by van der Waals forces in a closely packed triangular lattice. Nanotubes produced by this method vary in structure, although one structure tends to predominate. Although the laser vaporization process produces an improved yield of single-wall carbon nanotubes, the product is still heterogeneous, and the nanotubes tend to be too tangled for many potential uses of these materials. In addition, the laser vaporization of carbon is a high energy process.

Another way to synthesize carbon nanotubes is by catalytic decomposition of a carbon-containing gas by nanometer-scale metal particles supported on a substrate. The carbon feedstock molecules decompose on the particle surface, and the resulting carbon atoms then precipitate as part of a nanotube from one side of the particle. This procedure typically produces imperfect multi-walled carbon nanotubes.

Another method for production of single-wall carbon nanotubes involves the disproportionation of CO to form single-wall carbon nanotubes and $CO_2$ on alumina-supported transition metal particles comprising Mo, Fe, Ni, Co, or mixtures thereof. This method uses inexpensive feedstocks in a moderate temperature process. However, the yield is limited due to rapid surrounding of the catalyst particles by a dense tangle of single-wall carbon nanotubes, which acts as a barrier to diffusion of the feedstock gas to the catalyst surface, limiting further nanotube growth.

Control of ferrocene/benzene partial pressures and addition of thiophene as a catalyst promoter in an all-gas-phase process can produce single-wall carbon nanotubes. However, this method suffers from simultaneous production of multi-wall carbon nanotubes, amorphous carbon, and other products of hydrocarbon pyrolysis under the high temperature conditions necessary to produce high quality single-wall carbon nanotubes.

More recently, a method for producing single-wall carbon nanotubes has been reported that uses high pressure CO as the carbon feedstock and a gaseous transition metal catalyst precursor as the catalyst. ("Gas Phase Nucleation and Growth of Single-Wall Carbon Nanotubes from High Pressure Carbon Monoxide," International Pat. Publ. WO 00/26138, published May 11, 2000 ("WO 00/26138"), incorporated by reference herein in its entirety). This method possesses many advantages over other earlier methods. For example, the method can be done continuously, and it has the potential for scale-up to produce commercial quantities of single-wall carbon nanotubes. Another significant advantage of this method is its effectiveness in making single-wall carbon nanotubes without simultaneously making multi-wall nanotubes. Furthermore, the method produces single-wall carbon nanotubes in relatively high purity, such that less than about 10 wt % of the carbon in the solid product is attributable to other carbon-containing species, which includes both graphitic and amorphous carbon.

All known processes for formation of single-wall nanotubes involve a transition-metal catalyst, residues of which are invariably present in the as-produced material. Likewise, these processes also entail production of varying amounts of carbon material that is not in the form of single-wall nanotubes. In the following, this non-nanotube carbon material is referred to as "amorphous carbon."

There are chemical processes involving single-wall carbon nanotube manipulation for specific applications, such as, for example, "Chemical Derivatization Of Single-Wall Carbon Nanotubes To Facilitate Solvation Thereof; And Use Of Derivatized Nanotubes," International Pat. Publ. WO 00/17101, published Mar. 30, 2000, and "Carbon Fibers Formed From Single-Wall Carbon Nanotubes," International Pat. Publ. WO 98/39250, published Sep. 11, 1998, both of which are incorporated by reference herein. Many of these manipulation processes involve chemical reaction of the single-wall carbon nanotube sides and/or ends with other chemicals. These processes also often involve the physical interaction (through van der Waals or other inter-molecular forces) of nanotubes with one another or interaction of nanotubes with other matter within which they are suspended, encapsulated, or otherwise placed in proximity. Clearly, in performing a chemical or physical interaction process with nanotube material, any impurities present are likely to inhibit or modify such manipulation process and/or physical interactions making it difficult or even impossible to achieve the intended result.

One example of a nanotube interaction that has many uses is the process of self-assembly of nanotubes. Under some conditions, individual nanotubes self-assemble into "ropes" of many parallel nanotubes in van der Waals contact with one another. See, e.g., "Macroscopic Ordered Assembly of Carbon Nanotubes," International Pat. Publ. WO 01/30694 A1, published May 3, 2001, incorporated herein by reference. Likewise, individual single-wall carbon nanotube and ropes of single-wall carbon nanotube, can be caused to aggregate into large networks, which are themselves electrically conductive. This self-assembly process enables nanotubes and ropes of nanotubes to form such networks when they are suspended in a matrix of a different material. The presence of this network alters the electrical properties of a composite that includes nanotubes. The facility with which single-wall carbon nanotubes aggregate into ropes and networks is critically dependent upon the purity of the nanotube material.

Another example of nanotube manipulation is the chemical processing of nanotubes by reacting them with other chemicals to produce new materials and devices. Clearly, the presence of other species such as the transition metal catalyst or amorphous carbon material provides sites for chemical reaction processes that are distinct from the desired chemical reaction process involving the nanotube alone. As with any species involved in a chemical process, one seeks to perform that process with a pure species.

Likewise, the useful properties and behavior of nanotube-containing materials devices and articles of manufacture derive from the properties of the nanotubes themselves, and the absence of impurities in the nanotube material enhances the performance of any and all materials, devices, and articles of manufacture comprising nanotubes. Particular examples are those where the material, device, or article of manufacture must function in a high magnetic field or a chemically-active environment. Examples of such materials, device and articles would include those subjected to traditional nuclear magnetic resonance apparatus; those serving as electrodes in batteries, capacitors, sensors, and fuel cells; those implanted in or otherwise in contact with any living organism; those used in preparation of other materials requiring low-contamination environments (such as chemical apparatus, chemical storage devices, electronic materials and devices, or food processing equipment).

In environments where there are chemicals, such as oxygen, that react with the nanotubes at elevated temperatures, the presence of metallic particles reduces the temperature at which the nanotube material remains stable. This occurs because transition metals and transition metal compounds are known to catalyze the reaction of the nanotubes with other chemicals, such as oxygen, at elevated temperatures. High purity nanotubes, with the transition metal species substantially removed, would provide greater chemical stability to the nanotubes and a longer performance life to applications involving them.

SUMMARY OF THE INVENTION

The present invention relates to purified single-wall carbon nanotubes and means for their preparation. Known methods of single-wall carbon nanotube production all result in a product that contains single-wall carbon nanotubes in addition to impurities such as particles of the metal catalyst used in single-wall carbon nanotube production and small amounts of amorphous carbon sheets that surround the catalyst particles and appear on the sides of the single-wall carbon nanotubes and "ropes" of single-wall carbon nanotubes produced. The purification process removes the extraneous carbon as well as metal-containing residual catalyst particles. The process comprises oxidation of the single-wall carbon nanotube material, reduction of any oxidized metal species, and reaction of a halogen-containing gas with the metal-containing species in the as-produced single-wall carbon nanotube material. The oxidation step can be performed in a dry atmosphere or in an atmosphere comprising water vapor. The oxidation is performed at a temperature of at least about 200° C. In one embodiment, the process also includes repetition of the oxidation and halogenation reaction steps at the same or at higher subsequent oxidation temperatures.

Many processing methods and articles of manufacture involving single-wall carbon nanotube are enhanced by the use of pure single-wall carbon nanotube material in which the presence of such impurities is minimized. There is a clear need for pure nanotube material and methods for its production. The present invention relates to such high-purity nanotube material, specific means for the production of the material, and articles of manufacture incorporating said material. The purification methods disclosed involve all gas-phase chemical treatments of the as-produced single-wall carbon nanotube material. The methods disclosed are scalable to provide for large amounts of high-purity single-wall carbon nanotube material.

The material of this invention provides a superior nanotube material for applications because of the relative absence of impurities of metal and amorphous carbon, both of which exhibit different chemical, physical, and electrical behavior than the single-wall carbon nanotubes themselves.

Single-wall carbon nanotubes, purified to remove residual metal, are more stable and resistant to chemical attack at temperatures where metal-containing nanotube material would be chemically reactive. One example of such chemical attack would be oxidation of the nanotube material in air at temperatures exceeding 200° C. Without being bound by theory, it is believed that the presence of transition metal impurities in the nanotube material catalyzes the oxidation of that material; and removal of the transition metal impurities would increase the oxidation temperature of nanotube material in air to over 600° C.

The present invention enables the chemical processing of nanotubes by providing high purity single-wall carbon nanotubes for reactions with other chemicals to produce new materials and devices. The present invention also enables aggregation of the single-wall carbon nanotubes into ropes and networks and therefore enables all articles of manufacture, materials and processes that depend on the propensity of single-wall carbon nanotubes and ropes of single-wall carbon nanotubes to aggregate. Such entities include composite materials comprising single-wall carbon nanotubes wherein the materials' electrical, mechanical, optical, and/or thermal properties are enhanced by the presence of nanotube networks within the material. Such materials include bulk composite materials, paints, coatings, and adhesives whose electrical, mechanical, optical, and/or thermal properties depend in part on the presence of nanotube networks therein; electrical circuitry, electronic devices (including batteries, capacitors, transistors, memory elements, current control elements, and switches) whose properties and function depend in part on the presence of nanotube networks therein.

DESCRIPTION OF ILLUSTRATIVE EMBODIMENTS

Figure 1:
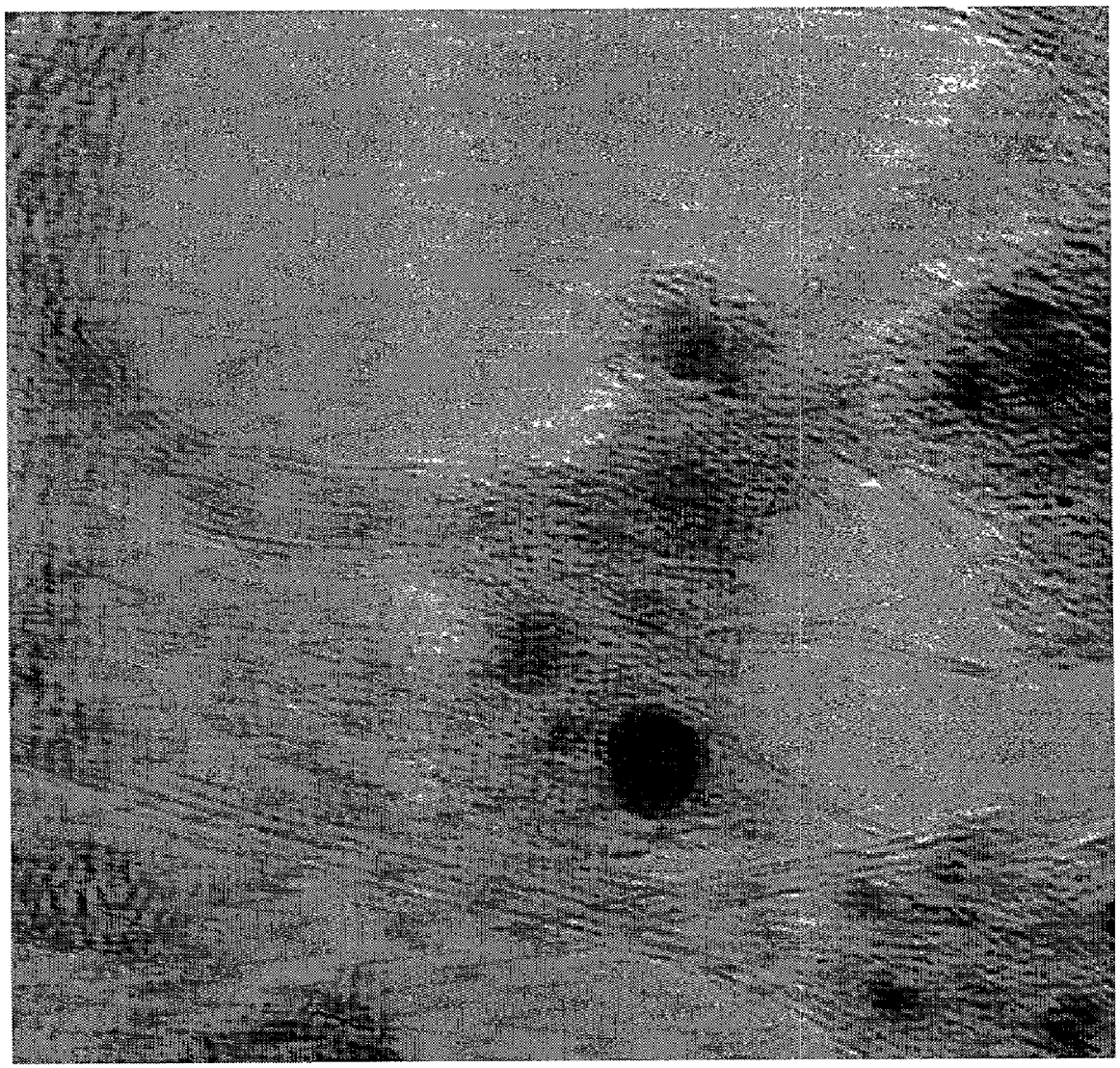
FIG. 1 is a transmission electron micrograph of single-wall carbon nanotube material as-produced by the laser oven method, showing encapsulation of the catalyst particles by graphitic shells of "amorphous carbon."

This invention provides a method for producing highly-purified single-wall carbon nanotube material in which the metal catalyst used in the production process and amorphous carbon generated in the production process are substantially removed. In one embodiment, the material contains less than about 5 wt % metal. In another embodiment of this invention, the single-wall carbon nanotube material contains less than about 1 wt % metal. Yet in another embodiment of this invention, the single-wall carbon nanotube material contains less than about 0.1 wt % metal. Additionally, in an embodiment of the present invention, single-wall carbon nanotube material contains less than about 5% by weight amorphous carbon. In another embodiment of the invention, single-wall carbon nanotube material of this invention contains less than about 1 wt % amorphous carbon and yet in another embodiment of this invention, single-wall carbon nanotube material contains less than about 0.2 wt % amorphous carbon.

This purified material comprises a fundamental improvement in products and articles of manufacture that incorporate single-wall carbon nanotubes, and it enables new and improved articles of manufacture, including, but not limited to: composite materials with electrical, mechanical, electromagnetic or chemical properties deriving in part from single-wall carbon nanotubes contained therein; electrodes of fuel cells, capacitors or batteries, particularly lithium-ion batteries; catalyst supports, structure-modifying additives for vehicle tires and laminated composites, including high-strength carbon fiber composites, anti-corrosion and other electrochemical materials and coatings; fibers containing or comprised entirely of single-wall carbon nanotubes; chemical, physical, and electronic sensors; films and coatings; inks and conducting materials that may be printed in any way; electrically and thermally conductive coatings, electrically and thermally conductive composite materials, electromagnetic and radio-frequency shielding materials; field emission cathodes; biologically-compatible coatings, objects and devices that are inserted or implanted into living organisms; radar-absorbing materials, optically-active materials and devices; components of systems that convert sunlight to electrical energy; electronic devices including transistors, pass elements, capacitors, inductors, resistors, connectors, switches, wires, interconnections devices and antennae at frequencies up to and including optical frequencies; electronic circuit fabrication materials; electrical and thermal conducting materials, transducers, electrical transmission cable, high-strength fiber, and structural elements of machines, buildings, and vehicles.

The fundamental improvements enabled by purified single-wall carbon nanotubes in all the foregoing applications derive primarily from the enhanced properties of purified single-wall carbon nanotubes to interact with other single-wall carbon nanotubes, with other materials in composite applications, with other chemicals, and with liquid agents that dissolve or suspend single-wall carbon nanotubes. This enhanced interaction, in turn, permits use of lower concentrations of single-wall carbon nanotubes in some applications, and improves the desired electrical, chemical, and/or mechanical properties of the materials, devices and/or other entities comprising single-wall carbon nanotubes in these and other applications.

This invention provides novel means of removing known impurities, such as metal catalyst and amorphous carbon, from as-made single-wall carbon nanotube material. FIG. 1 shows a typical single-wall carbon nanotube sample produced by the laser-oven process (See Rinzler, et al., *Applied Physics A* 1998 67, 29). Impurities in the form of 2–10 nanometer diameter metal particles and amorphous carbon are evident. Embodiments of this invention include means for removal of impurities as well as the purified material itself. In the present invention, impurities are removed by reacting the impurities to form other compounds that are either volatile or easily removable by subsequent process. The impurities contain metal-containing species from residual catalyst metal and amorphous carbon. One means disclosed for removing the metal-containing impurities is by chemical reaction with halogen-containing gases, such as $Cl_2$, $F_2$, $I_2$ and $Br_2$, HCl, HF, HI and HBr. The resulting metal halide formed by reaction between the halogen-containing gas and the metal can be volatilized for removal, such as by heating the material to be purified in a chamber which is cleared of volatile species by applying a vacuum, by purging the chamber with an inert gas, or by condensing the volatiles on a cold trap or surface.

Removing the residual catalyst metal impurity from the single-wall carbon nanotube product is problematic because the metal is usually encapsulated by a carbon coating which hinders access of reactants to the metal. Generally, the product from all known processes for producing single-wall carbon nanotubes contains catalyst impurity in the form of small 2–20 nanometer-diameter particles that are encapsulated with a layer or multiple layers of amorphous carbon. This encapsulation inhibits the access of other chemicals to the metal, and all heretofore-known purification processes leave substantial amounts of metal catalyst because of its relative inaccessibility to chemical attack.

The present invention incorporates a gas-phase means for accessing the encapsulated metal and converting it to other removable compounds. The initial step in the process of this invention uses gaseous reagents that diffuse through defects in the encapsulation and react with the metal to form compounds such as metal oxides and hydroxides. Gaseous reagents often comprise oxidizing gases, such as oxygen and carbon dioxide, and can contain water vapor. The metal oxides and metal hydroxides formed when the oxidizing gases react with metal occupy a larger volume than the original metallic impurity. The larger volume of the metal oxides and hydroxides promotes further cracks, fissures and defects in the carbon that encapsulates the metallic impurities. The more pronounced the defects and fissures in the encapsulating carbon, the more accessible the metal-containing species are to the gaseous reagents used for further reaction with the encapsulated metal species. The enhanced cracks and fissures facilitate both the access of the gaseous reagents for reaction with the metal-containing species and the egress of the reacted metal compounds, thereby enabling greater metal removal in the purification process. The gas-phase oxidation can be conducted at pressures in the range of about 0.01 and about 100 atmospheres.

The amorphous carbon encapsulating the metal-containing catalyst particles and other amorphous carbon formed as a by-product of the single-wall carbon nanotube production process are removed by direct reaction with gaseous reagents, typically gases capable of oxidizing or otherwise reacting with the carbon, such as oxygen and carbon dioxide. These reactions can be catalyzed by the original catalyst metal in the as-produced material.

Treatment of the impure sample with hydrogen is desirable after oxidation. Without being bound by theory, it is believed that the hydrogen treatment reduces metal oxides, hydroxides and carbides that may be present and that may be more resistant to subsequent metal removal steps than in their non-reduced states.

Generally, the gas-phase procedure for purifying single-wall carbon nanotubes comprises the steps of oxidation, reduction, and reaction of the metal-containing species with a halogen-containing gas. The procedure can further comprise annealing at high temperature.

The oxidation step serves a two-fold purpose. The first purpose is to remove amorphous carbon by oxidizing the amorphous carbon species to carbon oxides. This carbon oxidation is catalyzed by metal in close contact with the amorphous carbon, such as, for example the carbon that encapsulates the residual catalyst metal-containing species. The other purpose of oxidation is to convert the metal-containing catalyst particles into metal oxides and hydroxides. Since the metal oxides and hydroxides are larger in volume than the metal catalyst particles, they cause further cracking and fracturing of the carbon encapsulation. The oxidation is done in an oxidizing gaseous atmosphere, preferably comprising oxygen or carbon dioxide. The oxygen or carbon dioxide concentration can range from about 1 vol % to about 100 vol %, preferably about 1 vol % to about 30 vol %. Nitrogen or inert gases, such as argon, can be used to dilute the oxygen or carbon dioxide concentration. The oxidation temperature can range from about 200° C. to about 500° C. The oxidation time can range from about 1 hour to about 20 hours. Shorter times are preferable when expediency is desired. Water vapor can be added to the oxidizing gaseous atmosphere and the water vapor concentration can range up to the saturation limit of the gas used to introduce the water vapor into the reaction chamber. The water vapor concentration can range from about 0.5 vol % to about 50 vol %, but is generally, from about 0.5 vol % to about 10 vol %, and, more commonly, 0.5 vol % to about 5 vol %. Water vapor in the oxidation promotes the formation of metal hydroxide species, as well as keeps the single-wall carbon nanotubes more dispersible for subsequent processing. The formation of metal hydroxides, like the metal oxides, promotes the fissuring and cracking of the carbon encapsulation.

After oxidation, the reaction chamber can be evacuated by vacuum or purged with an inert gas. A gas comprising hydrogen can be introduced to reduce any metal carbides, oxides or hydroxides. The temperature of reduction can range from about 250° C. to about 500° C. The concentration of hydrogen gas can range from about 1 vol % to about 100 vol %. The total pressure during reduction can range from about 1 Torr to about 760 Torr.

After hydrogen reduction, the reactor can be evacuated by vacuum or purged with nitrogen or an inert gas, such as argon. The next step is reaction of the metal-containing impurities to other metal-containing species that can be volatilized with heat, or otherwise removed in a gaseous state. The metal-containing impurities can include pure metals, metal carbides, metal oxides and metal hydroxides. The preferred reactions with the metal-containing impurities are those of halogenation with a halogen-containing gas. The halogen-containing gas can be comprised of a halogen-containing compound such as $Cl_2$, $Br_2$, $F_2$, $I_2$, HCl, HBr, HF, HI, or other halogen-containing compounds that can react with the metal-containing impurities to form metal halides. Preferably, the halogen-containing gas comprises HCl or $Cl_2$. The halogenation reaction temperature can range from about 400° C. to about 850° C. The reaction time can range from about 30 minutes to about 2 hours. The concentration of the halogen-containing compound in the halogen-containing gas can range from about 1 vol % to about 100 vol %. The pressure of the halogenation reaction can range from about 1 Torr to about 760 Torr.

Following the halogenation reaction step, the metal halide species formed are removed. Removal can be accomplished by evacuating the reaction chamber by applying a vacuum to the chamber. Removal can also be accomplished by purging the reaction chamber with nitrogen or an inert gas, such as argon, at temperatures of at least about 400° C. to sweep out the volatile metal halides, or by simply providing a cold trap, or other cool surface, in or contiguous with the reaction chamber, upon which the volatile halides condense as solid material, and which is subsequently removed from the reaction chamber.

After the reaction chamber has been either evacuated or flushed to remove the volatile metal halides, the single-wall carbon nanotube material can be subjected to one or more subsequent oxidation/reduction/halogenation cycles, either at the same or higher temperatures. When performing more oxidation/reduction/halogenation cycles at higher temperatures, the temperature of any part of the cycle can be increased in increments of about 50° C. up to the oxidation and reduction temperatures of about 500° C. and the maximum halogenation temperature of about 850° C. The oxidation temperature may be raised to higher temperatures (such as, for example, 800° C.); however, as such high temperatures may cause degradation of the single-wall carbon nanotubes over time, care must be taken to limit the time of exposure of the single-wall carbon nanotubes to such high temperatures.

Optionally, annealing can be done as part of the purification procedure. Annealing has several benefits, including removing more amorphous carbon and correcting defects in the single-wall carbon nanotubes. Annealing can be done in a vacuum or in a gas comprising nitrogen, carbon dioxide, or an inert gas, such as argon. Annealing is preferably done at a temperature in the range of about 600° C. to about 1000° C. Annealing time can be on the order of about an hour. Water vapor can be used with nitrogen, carbon dioxide or any inert gas used in annealing. Without being bound by theory, it is believed that water vapor has the benefit of reducing the susceptibility of adjacent single-wall carbon nanotubes to bond together during annealing. Water vapor in the annealing gas mixture, thus, can provide the benefit of providing single-wall carbon nanotubes that are more dispersible after purification. The concentration of water vapor during annealing can be in the range from about 0.5 vol % to about 50 vol %, preferably 0.5 vol % to about 10 vol %, and more preferably 0.5 vol % to about 5 vol %. After annealing, the single-wall carbon nanotubes can be cooled in a vacuum, nitrogen or an inert gas.

This invention comprises embodiments that use entirely gas-phase procedures, as illustrated in the examples. The gas-phase methods have advantages over procedures involving a liquid-phase step. One advantage is that the material retains its original bulk density and is not densified and matted, which can occur in processes involving liquid wetting and cause difficulty in redispersing the single-wall carbon nanotubes. In purification procedures involving wetting with water or some other solvent that is used in the final washing process, subsequent evaporative drying causes the single-wall carbon nanotube sample to become more than order of magnitude denser than the initial raw material whose density is of the order 0.01 g/cc. This occurs because capillary forces cause a collapse of the space between small ropes of the single-wall carbon nanotubes that exist in the original sample. The denser product is more difficult to disperse in solvents; and for applications requiring dispersal of the nanotubes as individual single-wall carbon nanotube segments or ropes of single-wall carbon nanotubes, the all-gas phase methods are preferred. Additionally, the all-gas phase methods do not involve a liquid-solid separation step which can be time consuming, difficult and more expensive when purifying large quantities of single-wall carbon nanotube material. The all gas-phase purification methods disclosed here are rapid, effective, adaptable to continuous processing, and readily scalable for processing large quantities of single-wall carbon nanotube material.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This embodiment is an entirely gas-phase method for removing metals and non-nanotube carbon from as produced single-wall carbon nanotube samples. The approach preserves the high porosity of the original sample because a liquid removal step is not required. In this procedure, a low temperature metal-catalyzed gas phase oxidation step is utilized to remove non-nanotube carbon and facilitate the subsequent reaction and removal of the metal as a volatile metal halide by reaction with halogen-containing gases, such as HCl or $Cl_2$. All pure halogen gases, chlorine, bromine, fluorine, and iodine, as well as their gaseous acids (HCl, HBr, HF, and HI) function in the procedure. Removal of the resulting metal halide is accomplished by heating to temperatures sufficient to volatilize the particular metal halide. The temperatures required for volatilization of the metal halides are generally greater than about 400° C.

This procedure differs from a previously-described all gas-phase purification procedure disclosed in "Gas-Phase Purification of Single-Wall Carbon Nanotubes," John L. Zimmerman, et al., Chem. Materials, 12, 1361–1366, 2000, incorporated herein by reference, in that it separates the oxidative removal of non-nanotube carbon from the removal of the metal. This is important because it allows for low temperature catalytic oxidation of carbon shells that surround the metal clusters present in the as-made single-wall carbon nanotube material. The presence of a halide-containing gas during this step can poison the catalytic oxidation process. A low temperature metal-catalyzed oxidation step permits selective removal of the shell carbon because of its close proximity to the metal oxide catalyst. Thus, carbon shells can be removed without substantial loss of single-wall carbon nanotubes.

In this example, relatively high purity single-wall carbon nanotube material made by the process described in WO 00/26138 (see also Nikolaev, et al. *Chemical Physics Letters* 1999, 313, 91 ("Nikolaev")) and containing approximately 3 to 4 atomic % iron is purified to effectively remove metal and non-nanotube carbon using the following steps.

1. Heat the single-wall carbon nanotube material in air at about 250° C. for 5 hours.
2. Evacuate the chamber and fill it with either pure HCl gas or a gaseous mixture comprising HCl and nitrogen, or an inert gas, such as argon.
3. Heat the material in the chamber to about 800° C. and hold for about one hour.
4. While maintaining the chamber temperature at about 800° C., flush the chamber with nitrogen or an inert gas and pull a vacuum. Hold the chamber at about 800° C. for about one hour.
5. Cool in the vacuum to the next air oxidation temperature.
6. Repeat the above process beginning with Step 1 using an air oxidation temperature of about 350° C.

Using these steps, the iron content of relatively pure single-wall carbon nanotube material is reduced from about 3–4 atomic % to about 0.3 atomic %, as determined by thermogravimetric analysis.

Both non-nanotube carbon and metal are much less evident in TEM images of gas-phase-purified single-wall carbon nanotube samples when compared to the original material. The porosity and density of the sample appears essentially the same as the starting material. Variations of the process can involve use of wet air rather than dry air in the oxidation steps. Also the oxidation of the samples can be carried out in more than one furnace for convenience or economic reasons. Another method for removing the metal halide can be done by heating in an inert gas stream rather than performing the evacuation step.

EXAMPLE 2

In this example, single-wall carbon nanotube material made by the process described in WO 00/26138 (see also Nikolaev) and containing up to about 7 atomic % iron is purified using the following steps.
1. Evacuate the reaction chamber containing the single-wall carbon nanotube material.
2. Fill the chamber with approximately 500 Torr of anhydrous HCl at a temperature in the range of about 250° C. to about 400° C.
3. Heat the chamber to a temperature in the range of about 800° C. to about 850° C. for 30 to 45 minutes with the chamber pressure of approximately 700 Torr.
4. Purge the reaction chamber with nitrogen or an inert gas and cool down.

Using these steps, the iron content of the single-wall carbon nanotube material is reduced from about 6–7 atomic % to about 0.2–1.2 atomic %, as determined by thermo-gravimetric analysis.

EXAMPLE 3

In this example, single-wall carbon nanotube material as-produced by the laser-oven method, containing residual catalyst comprising cobalt and nickel, is purified in the following gas-phase procedure.
1. Oxidize the single-wall carbon nanotube material in ambient air at about 200° C. for about 2 hours.
2. Evacuate the reaction chamber and heat it to about 800° C.
3. Fill the chamber with anhydrous HCl to a pressure of approximately 700 Torr and hold for about 30 minutes.
4. Purge the chamber with nitrogen or an inert gas, such as argon, and cool down.

After Step 1 of this procedure, the residual metal oxide of the unpurified sample is typically about 16–20 wt % of the initial sample. After the complete procedure, the residual metal oxide is about 0.8 wt % of the initial sample.

EXAMPLE 4

Figure 2:
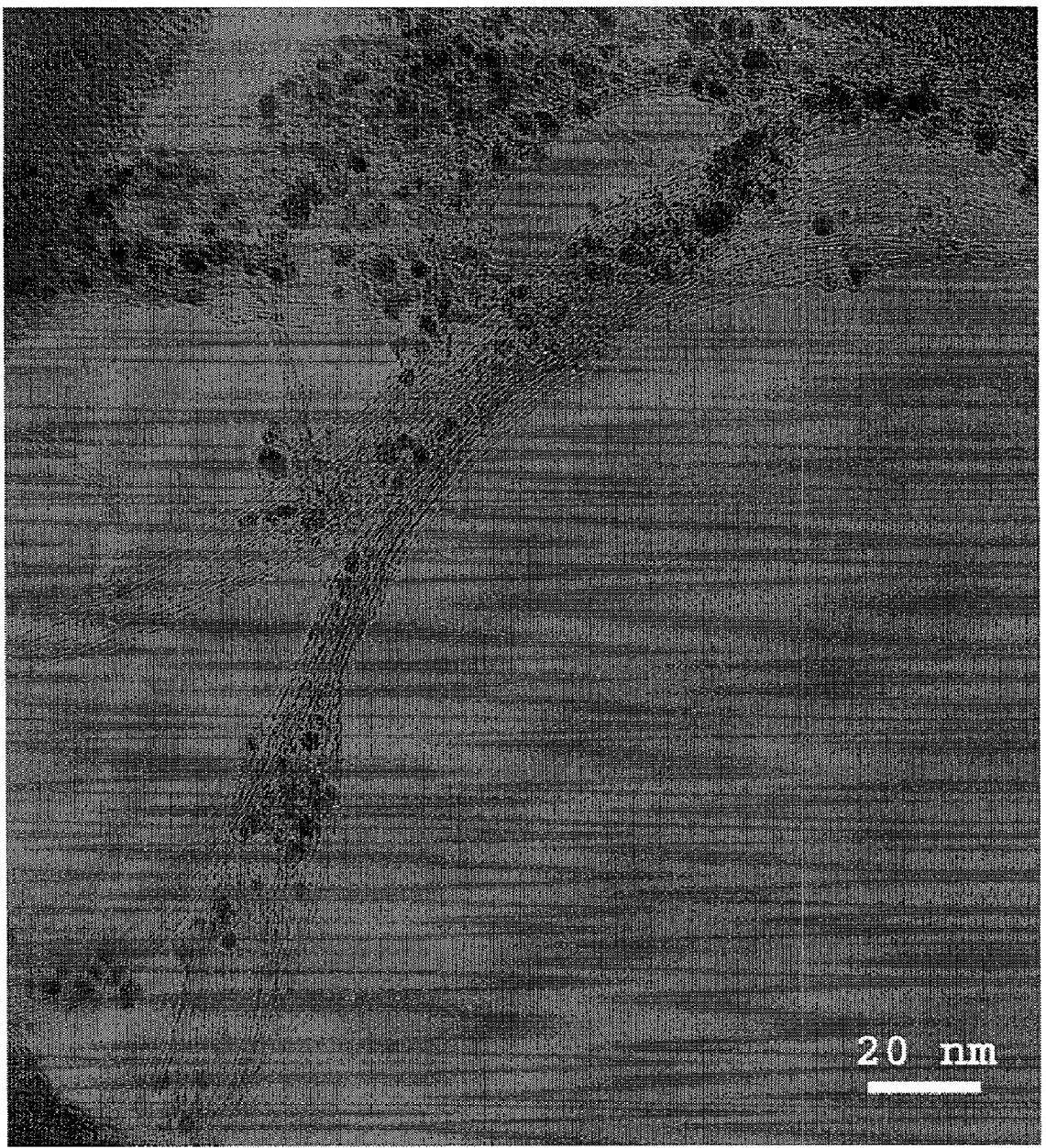
FIG. 2 is a transmission electron micrograph of single-wall carbon nanotube material before being purified according to an embodiment of the invention.

In this example, single-wall carbon nanotube material made by the process described in WO 00/26138 (see also Nikolaev), containing up to about 7 atomic % iron, and shown in the transmission electron micrograph of FIG. 2, is purified using the following steps.
1. Oxidize the single-wall carbon nanotube material in a chamber at about 250° C. in wet air for about 1 to 4 hours.
2. Evacuate the chamber and then fill it with anhydrous HCl.
3. Heat the chamber to about 800° C. and maintain the chamber pressure at approximately 730 Torr for about 1 hour.
4. Purge the chamber with inert gas.
5. Evacuate the chamber and hold it at a temperature of about 800° C. for about 1 hour.
6. Cool down the chamber while maintaining a vacuum.

Figure 3:
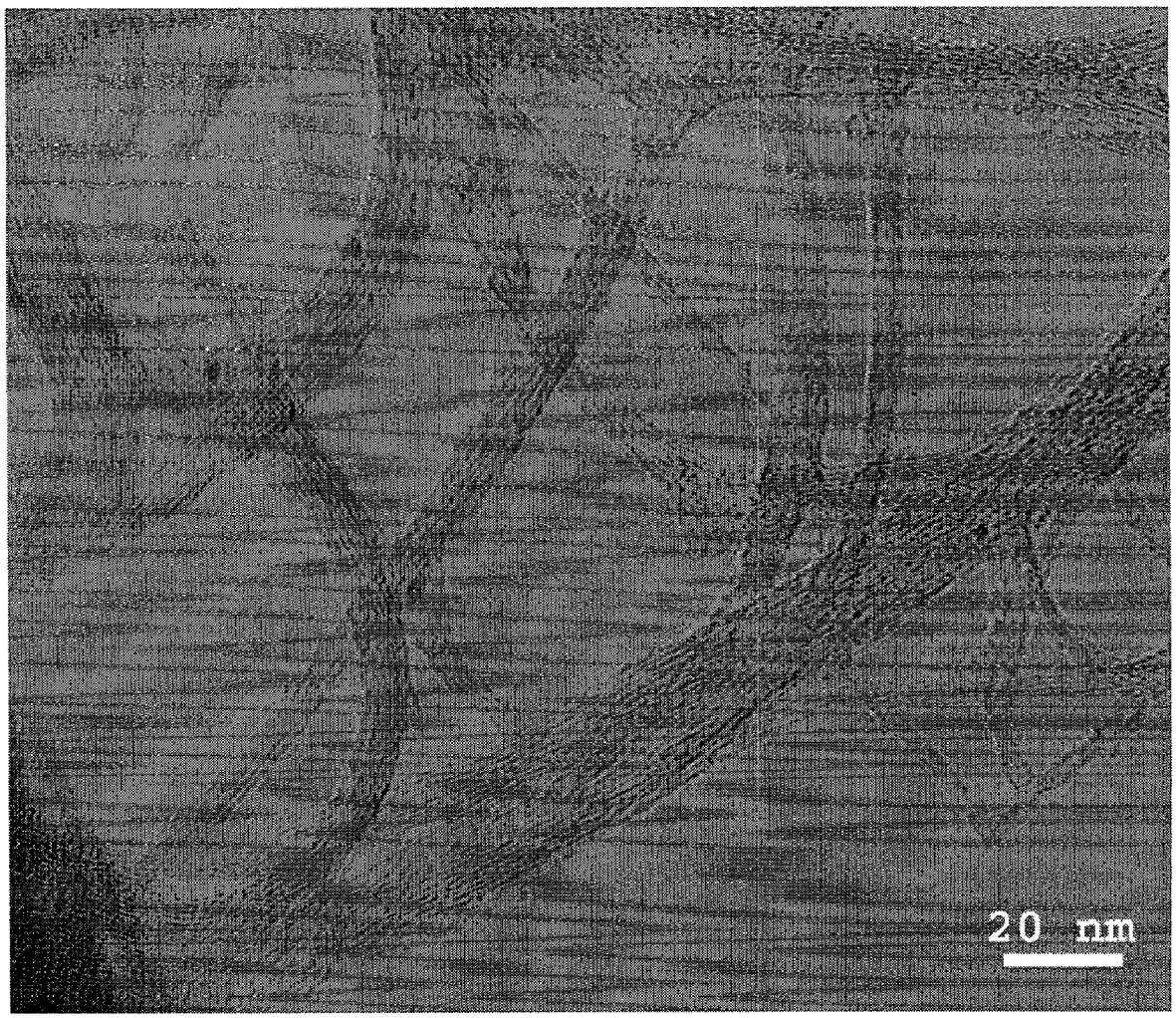
FIG. 3 is a transmission electron micrograph of single-wall carbon nanotube material after being purified according to an embodiment of the invention.

Using these steps, the iron content of the single-wall carbon nanotube material is reduced from about 6–7 atomic % to 0.2–0.7 atomic %, as determined by thermo-gravimetric analysis. A transmission electron micrograph of the purified single-wall carbon nanotube material is shown in FIG. 3.

EXAMPLE 5

In this example, single-wall carbon nanotube material made by the process described in WO 00/26138 (see also Nikolaev) and containing up to about 7 atomic % iron is purified using the following steps.
1. Oxidize the single-wall carbon nanotube material at about 160° C. with 100 psi dry air for 2 hours.
2. Treat with HCl gas at about 850° C. at a pressure of about 700 Torr for 2 hours.
3. Purge the reaction chamber with nitrogen, or an inert gas, such as argon, and cool down.

Ash tests indicated that metal content of the purified material was less than about 2 wt %. Typically about 60 wt % of the as-produced single-wall carbon nanotubes can be recovered.

"Purification and Characterization of Single-Wall Carbon Nanotubes," I. W. Chiang, et al., J. Phys. Chem. B, 105, 1157–1161, 2001, and "Purification and Characterization of Single-Wall Carbon Nanotubes Obtained from the Gas-Phase Decomposition of CO (HiPco Process)," J. Phys. Chem. B, 105, 8297–8301, 2001, may also provide exemplary procedural and/or other details supplementary to the above disclosure, and are specifically incorporated herein by reference.

What is claimed is:

1. A method for purifying single-wall carbon nanotubes comprising the steps of:
(a) oxidizing a single-wall carbon nanotube material in an oxidizing gaseous atmosphere at a temperature between about 200° C. and about 500° C. and at a pressure between about 0.01 and about 100 atmospheres, wherein the oxidizing gaseous atmosphere comprises a gas selected from the group consisting of oxygen, carbon dioxide, and mixtures thereof; and
(b) treating the single-wall carbon nanotube material with a halogen-containing gas subsequent to the step of oxidizing.

2. The method of claim 1, wherein the oxidizing gaseous atmosphere comprises water vapor.

3. The method of claim 1, wherein the oxidizing gaseous atmosphere comprises oxygen and water vapor.

4. The method of claim 1, wherein the oxidizing gaseous atmosphere comprises carbon dioxide.

5. The method of claim 1, wherein the halogen-containing gas comprises a halogen-containing compound selected from the group consisting of chlorine, bromine, fluorine, iodine, HCl, HBr, HF, HI, and combinations thereof.

6. The method of claim 1, wherein the halogen-containing gas comprises HCl.

7. The method of claim 1, wherein the halogen-containing gas comprises a halogen-containing compound at a concentration between about 1 vol % and about 100 vol % of the halogen-containing gas.

8. The method of claim 1, wherein the treating step is preformed at a pressure of at least about 1 Torr.

9. The method of claim 1, wherein the treating step is performed at a temperature between about 400° C. and about 850° C.

10. The method of claim 1 further comprising reducing the single-wall carbon nanotube material with a gas comprising hydrogen gas.

11. The method of claim 10, wherein the reducing step is performed at a temperature between about 250° C. and about 500° C.

12. The method of claim 1 further comprising annealing the single-wall carbon nanotube material.

13. The method of claim 12, wherein the annealing step is performed at a temperature between about 600° C. and about 1000° C.

14. A method for purifying single-wall carbon nanotubes comprising:
(a) oxidizing a single-wall carbon nanotube material in an oxidizing gaseous atmosphere;
(b) treating the single-wall carbon nanotube material with a halogen-containing gas; and
(c) annealing the single-wall carbon nanotube material, wherein the annealing step is performed in a vacuum.

15. The method of claim 12 wherein the annealing step is performed with an annealing gas comprising a gas selected from the group consisting of carbon dioxide, inert gases, nitrogen, and combinations thereof.

16. A method for purifying single-wall carbon nanotubes comprising:
(a) oxidizing a single-wall carbon nanotube material in an oxidizing gaseous atmosphere;
(b) treating the single-wall carbon nanotube material with a halogen-containing gas; and
(c) annealing the single-wall carbon nanotube material, wherein the annealing step is performed with an annealing gas comprising a gas selected from the group consisting of carbon dioxide, inert gases, nitrogen, and combinations thereof and wherein the annealing gas further comprises water vapor.

17. The method of claim 16, wherein the water vapor is at a concentration of at least about 0.5 vol % of the annealing gas.

18. The method of claim 1 further comprising recovering the single-wall carbon nanotube material to obtain purified single-wall carbon nanotube material, wherein
(a) the single-wall carbon nanotube material comprises single-wall carbon nanotubes, amorphous carbon, and a metallic impurity, and
(b) the amorphous carbon is present in an amount at most about 5 wt % of the purified single-wall carbon nanotube material.

19. The method of claim 18, wherein the amorphous carbon is present in an amount at most about 1 wt % of the purified single-wall carbon nanotube material.

20. The method of claim 18, wherein the amorphous carbon is present in an amount at most about 0.2 wt % of the purified single-wall carbon nanotube material.

21. The method of claim 1 further comprising recovering the single-wall carbon nanotube material to obtain purified single-wall carbon nanotube material, wherein
(a) the single-wall carbon nanotube material comprises single-wall carbon nanotubes, amorphous carbon, and a metallic impurity,
(b) the metallic impurity comprises metal; and
(c) the metal is present in an amount at most about 5 wt % of the purified single-wall carbon nanotube material.

22. The method of claim 21, wherein the metal is present in an amount at most about 1 wt % of the purified single-wall carbon nanotube material.

23. The method of claim 21, wherein the metal is present in an amount at most about 0.1 wt % of the purified single-wall carbon nanotube material.

24. A method for purifying single-wall carbon nanotubes comprising the steps of:
(a) oxidizing a single-wall carbon nanotube material comprising single-wall carbon nanotubes, amorphous carbon, and a metallic impurity in an oxidizing gaseous atmosphere, wherein the oxidizing gaseous atmosphere comprises a gas selected from the group consisting of oxygen, carbon dioxide and mixtures thereof;
(b) reducing the single-wall carbon nanotube material with a reducing gas comprising hydrogen subsequent to the step of oxidizing; and
(c) treating the single-wall carbon nanotube material with a halogen-containing gas subsequent to the step of reducing.

25. The method of claim 24, wherein the gas is oxygen and the oxygen is at a concentration of at least about 1 vol % of the oxidizing gaseous atmosphere.

26. The method of claim 24, wherein the oxidizing gaseous atmosphere comprises air.

27. The method of claim 24, wherein the oxidizing gaseous atmosphere comprises water vapor.

28. The method of claim 27 wherein the water vapor is at a concentration of at least about 0.5 vol % of the oxidizing gaseous atmosphere.

29. The method of claim 24, wherein the oxidizing gaseous atmosphere comprises oxygen and water vapor.

30. The method of claim 24, wherein the gas is oxygen and the oxygen is at a concentration between about 10 vol % and about 100 vol % of the oxidizing gaseous atmosphere.

31. The method of claim 24, wherein the oxidizing gaseous atmosphere comprises carbon dioxide.

32. The method of claim 31, wherein the carbon dioxide is at a concentration of at least about 1 vol % of the oxidizing gaseous atmosphere.

33. The method of claim 24, wherein the oxidizing gaseous atmosphere comprises a second gas selected from the group consisting of inert gases, nitrogen, and combinations thereof.

34. The method of claim 24, wherein the oxidizing step is performed at a temperature at least about 200° C.

35. The method of claim 24, wherein the halogen-containing gas comprises a gas selected from the group consisting of chlorine, bromine, fluorine, iodine, HCl, HBr, HF, HI, and combinations thereof.

36. The method of claim 24, wherein the halogen-containing gas comprises HCl.

37. The method of claim 24, wherein the halogen-containing gas comprises a halogen-containing compound at a concentration between about 1 vol % and about 100 vol % of the halogen-containing gas.

38. The method of claim 24, wherein the treating step is performed at a pressure between about 1 Torr and about 760 Torr.

39. The method of claim 24, wherein the treating step is preformed at a temperature between about 400° C. and about 850° C.

40. The method of claim 24, wherein the reducing step is performed at a temperature between about 250° C. and about 500° C.

41. The method of claim 24, wherein the reducing step is performed at a pressure between about 1 Torr and about 760 Torr.

42. The method of claim 24 further comprising annealing the single-wall carbon nanotube material.

43. The method of claim 42, wherein the annealing step is performed at a temperature between about 600° C. and about 1000° C.

44. The method of claim 42, wherein the annealing, step is performed in a vacuum.

45. The method of claim 42 wherein the annealing step is performed with an annealing gas comprising a gas selected from the group consisting of carbon dioxide, inert gases, nitrogen, and combinations thereof.

46. The method of claim 45, wherein the annealing gas comprises water vapor.

47. The method of claim 46, wherein the water vapor is at a concentration of at least about 0.5 vol % of the annealing gas.

48. The method of claim 24 further comprising recovering the single-wall carbon nanotube material to obtain purified single-wall carbon nanotube material, wherein the amorphous carbon is present in an amount at most about 5 wt % of the purified single-wall carbon nanotube material.

49. The method of claim 48, wherein the amorphous carbon is present in an amount at most about 1 wt % of the purified single-wall carbon nanotube material.

50. The method of claim 48, wherein the amorphous carbon is present in an amount at most about 0.2 wt % of the purified single-wall carbon nanotube material.

51. The method of claim 24 further comprising recovering the single-wall carbon nanotube material to obtain purified single-wall carbon nanotube material, wherein (a) the metallic impurity comprises metal, and
(b) the metal is present in an amount at most about 5 wt % of the purified single-wall carbon nanotube material.

52. The method of claim 51, wherein the metal is present in an amount at most about 1 wt % of the purified single-wall carbon nanotube material.

53. The method of claim 51, wherein the metal is present in an amount at most about 0.1 wt % of the purified single-wall carbon nanotube material.

54. A method for purifying carbon nanotubes comprising the steps of:
  (a) oxidizing a carbon nanotube material in an oxidizing gaseous at a temperature between about 200° C. and about 500° C. and at a pressure between about 0.01 and about 100 atmospheres, wherein the oxidizing gaseous atmosphere comprises a gas selected from the group consisting of oxygen, carbon dioxide and mixtures thereof; and
  (b) treating the carbon nanotube material with a halogen-containing gas subsequent to the step of oxidizing.

55. A method for purifying carbon nanotubes comprising the steps of:
  (a) oxidizing a carbon nanotube material comprising carbon nanotubes, amorphous carbon, and a metallic impurity in an oxidizing gaseous atmosphere, wherein the oxidizing gaseous atmosphere comprises a gas selected from the group consisting of oxygen, carbon dioxide and mixtures thereof;
  (b) reducing the carbon nanotube material with a reducing gas comprising hydrogen subsequent to the step of oxidizing; and
  (c) treating the carbon nanotube material with a halogen-containing gas subsequent to the step of reducing.

* * * * *